(12) United States Patent
Li et al.

(10) Patent No.: US 12,313,839 B2
(45) Date of Patent: May 27, 2025

(54) MEMS MICROMIRROR WITH HIGH DUTY CYCLE, MICROMIRROR ARRAY AND PREPARATION METHOD THEREOF

(71) Applicant: Anhui China Science MW Electronic Technology Co., Ltd., Bengbu (CN)

(72) Inventors: Wei Li, Bengbu (CN); Jing Xu, Bengbu (CN)

(73) Assignee: Anhui China Science MW Electronic Technology Co., Ltd., Bengbu (CN)

( * ) Notice: Subject to any disclaimer, the term of this patent is extended or adjusted under 35 U.S.C. 154(b) by 527 days.

(21) Appl. No.: 17/711,020

(22) Filed: Mar. 31, 2022

(65) Prior Publication Data

US 2023/0069884 A1  Mar. 9, 2023

(30) Foreign Application Priority Data

Aug. 30, 2021 (CN) .......................... 202111004154.4

(51) Int. Cl.
*G02B 26/08* (2006.01)
*G02B 26/10* (2006.01)

(52) U.S. Cl.
CPC ....... *G02B 26/0833* (2013.01); *G02B 26/101* (2013.01)

(58) Field of Classification Search
CPC .............. G02B 26/0833; G02B 26/101; G02B 26/0841
See application file for complete search history.

(56) References Cited

U.S. PATENT DOCUMENTS

2003/0007262 A1* 1/2003 Tsuboi ................. G02B 26/085
                                                    359/224.1
2003/0227700 A1* 12/2003 Mizuno .............. G02B 26/0841
                                                    310/309

* cited by examiner

*Primary Examiner* — Euncha P Cherry
(74) *Attorney, Agent, or Firm* — IPRTOP LLC

(57) ABSTRACT

The present disclosure provides a MEMS micromirror with a high duty cycle, a micromirror array, and a preparation method thereof, wherein a plurality of first movable combs and a plurality of first fixed combs of the MEMS micromirror are located under the silicon layer of the reflector, which improves the duty cycle and effectively reduces the size of the MEMS micromirror while achieving large angle deflection in two directions. The silicon layer of the reflector has a reinforcing rib underneath, which effectively improves surface smoothness of the MEMS micromirror when the latter is still or moving. In addition, the MEMS micromirror has a variety of electrode lead-out forms including a double-sided electrode structure, and the electrode lead-out form during actual implantation can be selected as needed, which is conducive to the commercialization of MEMS micromirrors and micromirror arrays.

11 Claims, 10 Drawing Sheets

MEMS MICROMIRROR WITH HIGH DUTY CYCLE, MICROMIRROR ARRAY AND PREPARATION METHOD THEREOF

CROSS REFERENCE TO RELATED APPLICATION

This application claims the benefits of priority to Chinese Patent Application No. CN 202111004154.4, entitled "MEMS MICROMIRROR WITH HIGH DUTY CYCLE, MICROMIRROR ARRAY AND PREPARATION METHOD THEREOF", filed with CNIPA on Aug. 30, 2021, the contents of which are incorporated herein by reference in its entirety.

BACKGROUND

Field of Disclosure

The present disclosure relates to microelectronic mechanical systems (MEMS), particularly to a MEMS micromirror with a high duty cycle, a micromirror array, and a preparation method thereof.

Description of Related Arts

A MEMS micromirror mainly consists of a drive structure and an optical reflector to cause a light beam to deflect or scan in a horizontal or vertical direction. Due to its advantages such as low crosstalk, fast switching speed, small size, and easy large-scale integration, electrostatically driven MEMS micromirrors can be used in laser scanning, projection, optical fiber communication networks, etc. Especially in optical fiber communication networks, electrostatically driven MEMS micromirrors and micromirror arrays are the main options to achieve optical attenuation, optical switching, and optical cross-connections, and are widely used in backbone networks or large switching networks, and therefore have a high industrial value.

There are mainly two types of electrostatically driven MEMS micromirrors: panel-like MEMS micromirrors, and MEMS micromirrors with a vertical comb structure. The drive structure of a panel-like MEMS micromirror may be located under its reflector, so that it is easy to form a MEMS micromirror with a high duty cycle, but the size, shape, and maximum deflection angle of the mirrors of the MEMS micromirror are limited by its chip's structure and fabrication process thereof; especially for a two-axis MEMS micromirror, it is difficult to achieve a large angular deflection; the drive structure of a MEMS micromirror with a vertical comb structure is usually arranged around its mirrors, so that a large angular deflection can be achieved. Vertical comb driving is one of the main ways to achieve deflection of a MEMS micromirror, but it is difficult to form a MEMS micromirror with a high duty cycle that adopts vertical comb driving, which is one of the main obstacles in applying MEMS micromirrors and micromirror arrays. Therefore, MEMS micromirrors with a large deflection angle and a high duty cycle have become an important technical challenge.

In summary, how to improve MEMS micromirrors and micromirror arrays to eliminate the above-mentioned shortcomings is an urgent problem to be solved.

SUMMARY

The present disclosure provides a MEMS micromirror with a high duty cycle, wherein the MEMS micromirror comprises: a first base, a second base, and a base plate stacked in sequence.

The first base comprises a reinforcing rib, first movable combs, second movable combs, a first elastic beam, a second elastic beam, an isolation groove, a first inner frame, a first outer frame, a silicon layer of a reflector, a third outer frame, with the first movable combs located below the silicon layer of the reflector and the reinforcing rib located below the silicon layer of the reflector.

The second base is located below the first base, and comprises first fixed combs, second fixed combs, a second inner frame, a second outer frame.

The first fixed combs are located below the first movable combs and are staggered with the first movable combs, the second fixed combs are located below the second movable combs and are staggered with the second movable combs; the first inner frame and the second inner frame forms an inner frame; the first outer frame, the second outer frame, and the third outer frame form an outer frame.

The base plate is located below the second base with a holding space formed in the base plate to provide room for the final device to operate.

The MEMS micromirror also comprises a metal layer of the reflector, disposed on an upper surface of the silicon layer of the reflector.

The MEMS micromirror also comprises a plurality of metal electrodes electrically connected to the first movable combs, the second movable combs, the first fixed combs, and the second fixed combs, respectively.

Optionally, the first movable combs are arranged in a first direction and the second movable combs are located at a periphery of the first inner frame and arranged in a second direction: the first elastic beam is arranged in the first direction and connects the silicon layer of the reflector and the first inner frame, and the second elastic beam is arranged in the second direction and connects the first inner frame and the first outer frame.

Optionally, the MEMS micromirror also comprises a second additional elastic beam disposed in a lower part of the second elastic beam, and the second elastic beam and the second additional elastic beam are isolated from each other or connected by a dielectric layer.

Optionally, the MEMS micromirror also comprises a third inner frame disposed above the first inner frame, and the third inner frame extends over the second movable combs to form hidden combs.

Optionally, the base plate is a third base comprising several first electrode through-holes, several second electrode through-holes, and the holding space, wherein surfaces of the first electrode through-holes and the second electrode through-holes are covered with a dielectric layer; wherein the second outer frame is formed with a first electrode groove and a first electrode insulation groove around the first electrode groove, and the first electrode through-hole is communicated with the first electrode groove a first metal electrode is formed on a surface of the dielectric layer on the first electrode groove and the first electrode through-hole, and a second metal electrode is formed on a surface of the dielectric layer on the second electrode through-hole, thereby forming the metal electrodes.

Optionally, the base plate is a fourth base comprising an insulating filling groove, base plate insulation grooves, and the holding space, wherein a lower part of a third electrode through-hole, and a lower part of a fourth electrode through-hole are also formed in the first outer frame.

The third outer frame is formed with an upper part of the third electrode through-hole and an upper part of the fourth electrode through-hole, which are correspondingly communicated with the lower part of the third electrode through-hole, and the lower part of the fourth electrode through-hole.

The lower part of the third electrode through-hole and the upper part of the third electrode through-hole form the third electrode through-hole, and the lower part of the fourth electrode through-hole and the upper part of the fourth electrode through-hole form the fourth electrode through-hole.

On the outer frame, electrode insulation grooves are formed around the third electrode through-hole and the fourth electrode through-hole.

The insulating filling grooves extend in such a way that they correspond to or connect with the base plate insulation grooves, and the base plate insulation grooves vertically correspond to or connect with the electrode insulation grooves, or the insulating filling grooves vertically correspond to or connect with the electrode insulation grooves.

A third metal upper electrode and a fourth metal upper electrode are formed on surfaces of the third electrode through-hole and the fourth electrode through-hole, respectively; wherein a third metal lower electrode and a fourth metal lower electrode are formed in an area enclosed by the insulating filling grooves, located at a bottom surface of the fourth base, thereby forming the lower and upper metal electrodes.

Optionally, a MEMS micromirror array is an array of a number of MEMS micromirrors with a high duty cycle described above, which are arranged in the first direction and/or the second direction.

The present disclosure also provides a method for preparing a MEMS micromirror with a high duty cycle, wherein the method comprises:
  providing a first base, wherein the first base comprises a stacked structure comprising a first substrate layer, a first dielectric layer, a first device layer, a second dielectric layer, and a second device layer stacked in sequence;
  etching the second device layer and the second dielectric layer to form a reinforcing rib, first movable combs, second movable combs, a first elastic beam, a second elastic beam, an isolation groove, a first inner frame, and a first outer frame;
  providing a second base, wherein the second base comprises a third dielectric layer, and a third device layer sequentially stacked, and bonding the second base to the first base;
  etching the third device layer and the third dielectric layer, forming in the third device layer first fixed combs, second fixed combs, a second inner frame, and a second outer frame; wherein the first fixed combs are located below and staggered with the first movable combs, and the second fixed combs are located below and staggered with the second movable combs;
  providing a base plate, bonding the base plate to the second base, wherein electrode through-holes are formed in the base plate to allow for electrical connections; a holding space is also formed in the base plate to provide room for the final device to operate;
  etching the first device layer and the first dielectric layer to form a silicon layer of a reflector, and a third outer frame, wherein the first movable combs are located below the silicon layer of the reflector and the reinforcing rib is located below the silicon layer of the reflector;
  forming a metal layer of the reflector on an upper surface of the silicon layer of the reflector;
  forming a plurality of metal electrodes, which are electrically connected to the first movable combs, the second movable combs, the first fixed combs, and the second fixed combs, respectively.

The present disclosure also provides yet another method of preparing a MEMS micromirror with a high duty cycle, wherein the method comprises:
  providing a base plate, forming in the base plate a holding space, insulating filling grooves and base plate insulation grooves, with the base plate insulation grooves vertically corresponding to the insulating filling grooves;
  providing a first base, wherein the first base comprises a stacked structure comprising a first substrate layer, a first dielectric layer, a first device layer, a second dielectric layer, and a second device layer stacked in sequence;
  etching the second device layer to form a reinforcing rib, first movable combs, second movable combs, a first elastic beam, a second elastic beam, an isolation groove, lower parts of electrode through-holes, a first inner frame, and a first outer frame;
  providing a second base, wherein the second base comprises a third dielectric layer, and a third device layer sequentially stacked, and bonding the second base to the first base;
  etching the third device layer and the third dielectric layer, forming in the third device layer first fixed combs, second fixed combs, an insulation groove, a second inner frame, and a second outer frame; wherein the first fixed combs are located below and staggered with the first movable combs, and the second fixed combs are located below and staggered with the second movable combs;
  wherein the base plate and the second base are fixed together by metal bonding or silicon-silicon bonding;
  etching the first device layer and the first dielectric layer to form a silicon layer of a reflector, a third outer frame, and upper parts of electrode through-holes, wherein the first movable combs are located below the silicon layer of the reflector and the reinforcing rib is located below the silicon layer of the reflector;
  forming a metal layer of the reflector on an upper surface of the silicon layer of the reflector;
  forming a plurality of upper and lower metal electrodes, wherein the plurality of metal electrodes are electrically connected to the first movable combs, the second movable combs, the first fixed combs, and the second fixed combs, respectively.

Optionally, a second additional elastic beam is formed and located in a lower part of the second elastic beam, wherein the second additional elastic beam is formed during etching of the third device layer and the third dielectric layer.

As described above, the MEMS micromirror with a high duty cycle, the micromirror array, and the preparation method thereof of the present disclosure have the following beneficial effects: the first movable combs and the first fixed combs of the MEMS micromirror of the present disclosure are located below the silicon layer of the reflector, which improves the duty cycle of the MEMS micromirror and effectively reduces the size of the MEMS micromirror while achieving large angle deflection in two directions. The silicon layer of the reflector has a reinforcing rib underneath, which effectively improves surface smoothness of the MEMS micromirror when the latter is still or moving. In addition, the MEMS micromirror of the present disclosure has a variety of electrode lead-out forms including a double-sided electrode structure, and the electrode lead-out form during actual implantation can be selected as needed, which is conducive to the commercialization of MEMS micromirrors and micromirror arrays. Therefore, the present disclosure effectively overcomes various shortcomings of the prior art and has a high industrial value.

BRIEF DESCRIPTION OF THE DRAWINGS

FIG. 13 shows a schematic diagram of a structure formed with a lower part of a third electrode through-hole 130a, a lower part of a fourth electrode through-hole 131a, and a lower part of a fourth electrode insulation groove 127a.

Figure 1A:
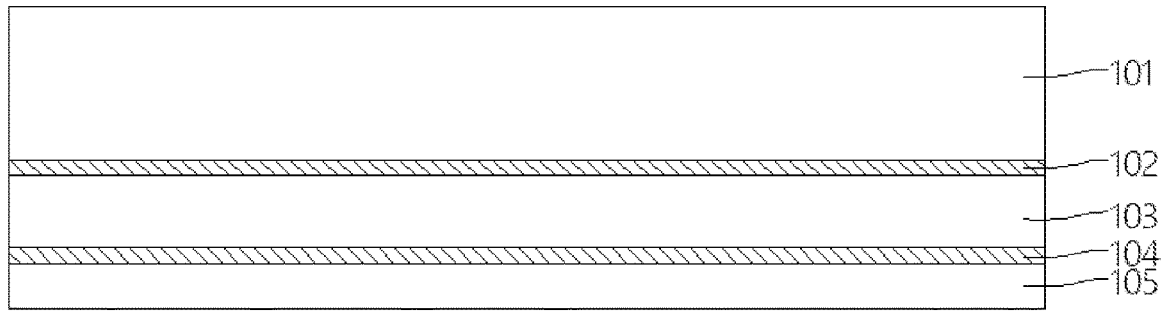
FIG. 1(a) shows a schematic structural diagram of a first base including two dielectric layers.

| Reference Numerals | | | |
|---|---|---|---|
| 101 | First substrate layer | 102 | First dielectric layer |
| 103 | First device layer | 104 | Second dielectric layer |
| 105 | Second device layer | 111 | Reinforcing rib |
| 108 | Silicon substrate | 107 | Buried oxide layer |
| 112 | First movable comb | 113 | First elastic beam |
| 115 | Second movable comb | 117 | Isolation groove; |
| 116 | Second elastic beam | 124a | First outer frame |
| 114a | First inner frame | 202 | Third device layer |
| 201 | Third dielectric layer | 204 | Second substrate layer |
| 203 | Fourth dielectric layer | 212 | First fixed comb |
| 205 | Fifth dielectric layer | 214 | Second inner frame |
| 215 | Second fixed comb | 218 | First electrode groove |
| 224 | Second outer frame | 301 | Fourth device layer |
| 217 | First electrode insulation groove | 312 | Second electrode through-hole |
| 313 | First electrode through-hole | 114b | Third inner frame |
| 118 | Silicon layer of a reflector | 119 | Metal layer of a reflector |
| 124b | Third outer frame | 321 | Second metal electrode |
| 311 | First metal electrode | 106 | Top silicon layer |
| 216 | Second additional elastic beam | 131a | Lower part of fourth electrode through-hole |
| 130a | Lower part of third electrode through-hole | 227 | A-type electrode insulation groove |
| 127a | Lower part of fourth electrode insulation groove | 411 | First insulating filling groove |
| 401 | Fourth base; | 130b | Upper part of third electrode through-hole |
| 247 | Electrode edge insulation groove | 427 | Second base plate insulation groove |
| 437 | Third base plate insulation groove | 447 | Fourth base plate insulation groove |
| 417 | First base plate insulation groove | 127b | Upper part of fourth electrode insulation groove |
| 412 | Second insulating filling groove | 420 | Third metal lower electrode |
| 131b | Upper part of fourth electrode through-hole | 237 | B-type electrode insulation groove |
| 127 | Fourth electrode insulation groove | 431 | First metal-layer gap |
| 421 | Fourth metal lower electrode | 413 | Third insulating filling groove |
| 403 | Metal contact layer | 120 | Third metal upper electrode |
| 432 | Second metal-layer gap | 114 | Inner frame |
| 414 | Fourth insulating filling groove | 11 | First direction |
| 121 | Fourth metal upper electrode | 12 | Second direction |
| 124 | Outer frame | 130 | Third electrode through-hole |
| 131 | Fourth electrode through-hole | | |

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure.

For example, when the embodiments of the present disclosure are described in detail, for ease of description, the cross-sectional view showing the device structure will not be partially enlarged according to the general scale, and the schematic diagram is only an example, which should not be regarded as a limitation to the scope of protection. In addition, the three-dimensional dimensions of length, width, and depth should be included in the actual production.

For the convenience of description, spatial relationship terms such as "below", "under", "beneath", "on", "above", "up", etc. may be used herein to describe the relationships between an element or feature and other elements or features. It will be understood that these spatial relationship terms are intended to encompass directions/orientations of the device in use or operation other than those depicted in the drawings. In addition, when a first layer is referred to as being "between" a second layer and a third layer, the first layer may be the only layer between the second and third layers, or there may more layers between the second and third layers. Herein, "between . . . " are used to include both endpoints.

In the context of this disclosure, the structure described with a first feature "on" a second feature may include embodiments where the first and second features are formed in direct contact, or it may include embodiments where additional features are formed between the first and second features such that the first and second features are not in direct contact.

It should be noted that the drawings provided in this disclosure only illustrate the basic concept of the present invention schematically, so the drawings only show the components related to the present invention. The drawings are not necessarily drawn according to the number, shape, and size of the components in actual implementation; during the actual implementation, the type, quantity, and proportion of each component can be changed as needed, and the components' layout may also be more complicated.

Embodiment 1

Figure 20:
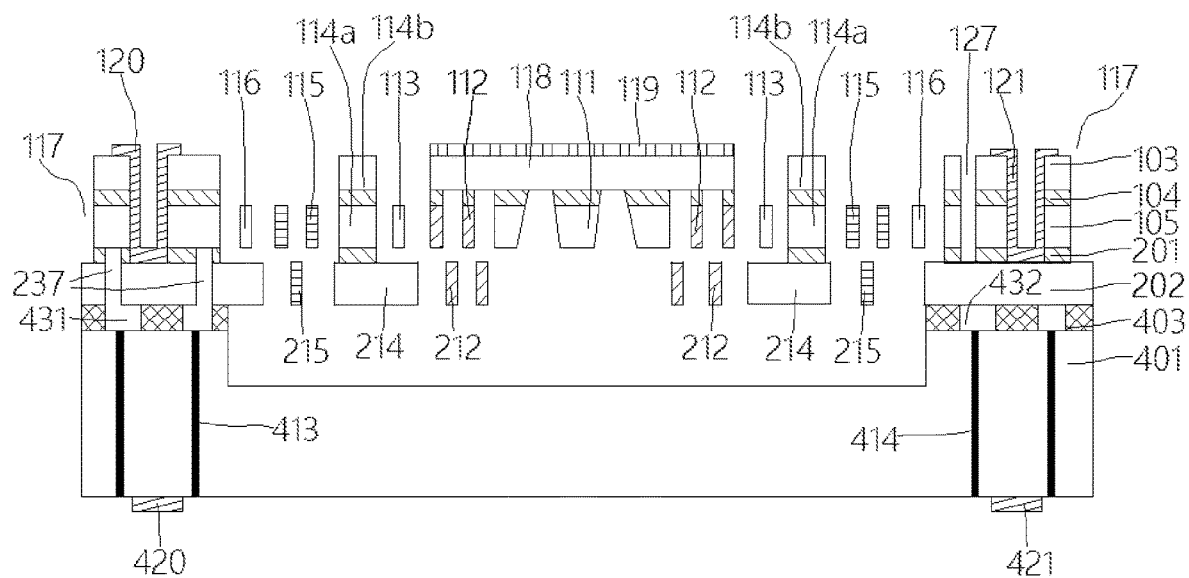
FIG. 20 shows a schematic diagram of a final structure of a MEMS micromirror when its fourth base is bonded to its third device layer 202 by a metal contact layer 403.
Figure 21:
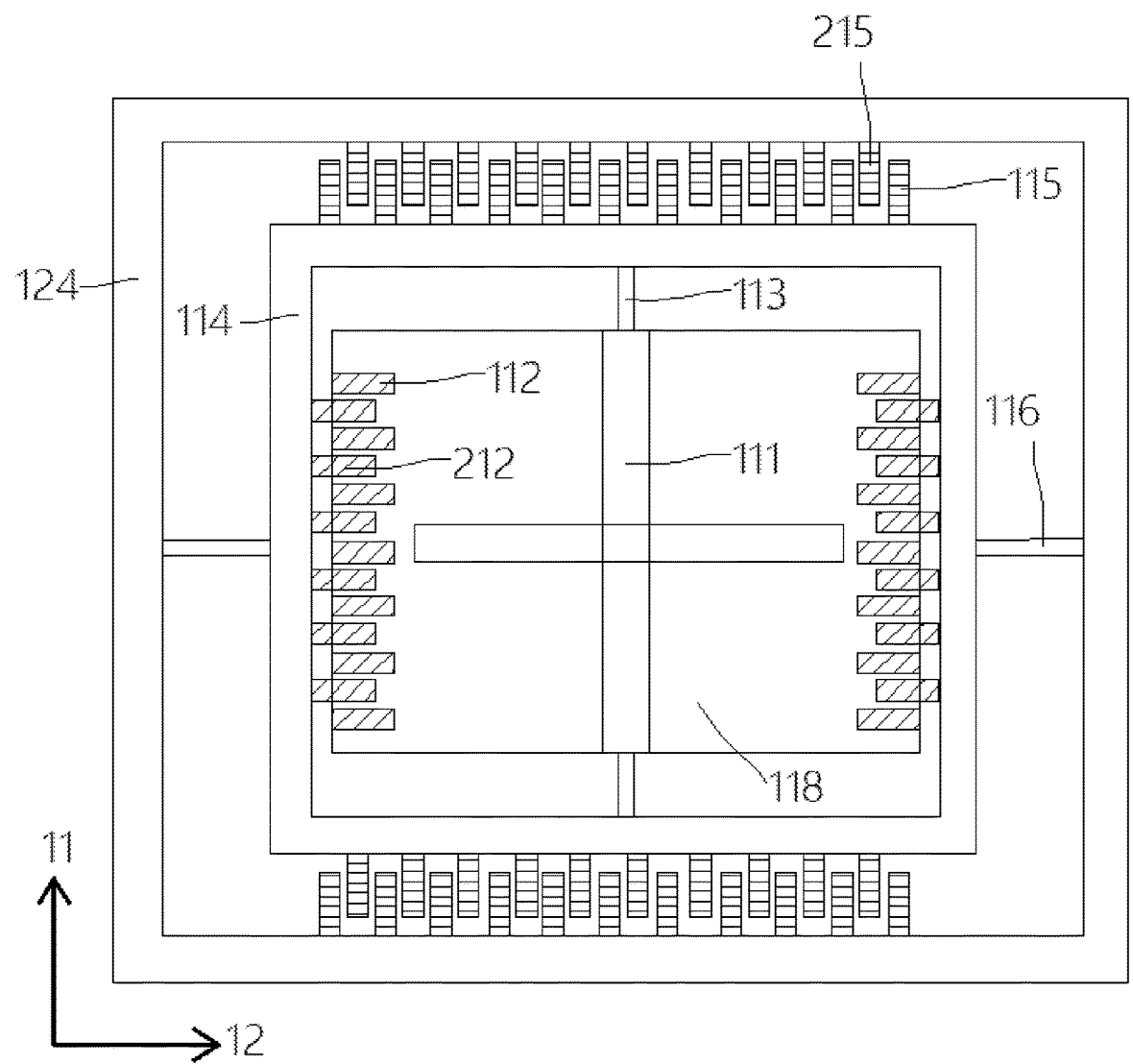
FIG. 21 shows a top view of a MEMS micromirror.

This embodiment provides a method of preparing a MEMS micromirror with a high duty cycle, referring to FIG. 21; the method includes the following steps (it should be noted that FIGS. 1-20 are not cross-sectional diagrams technically, but are structural schematics illustrating the process flow):

S11: providing a first base, wherein the first base comprises a stacked structure comprising a first substrate layer 101, a first dielectric layer 102, a first device layer 103, a second dielectric layer 104, and a second device layer 105, which are sequentially stacked, or the first substrate comprises a Silicon On Insulator (SOI) substrate comprising a silicon substrate 108, a buried oxide layer 107, and a top silicon layer 106.

Figure 1B:
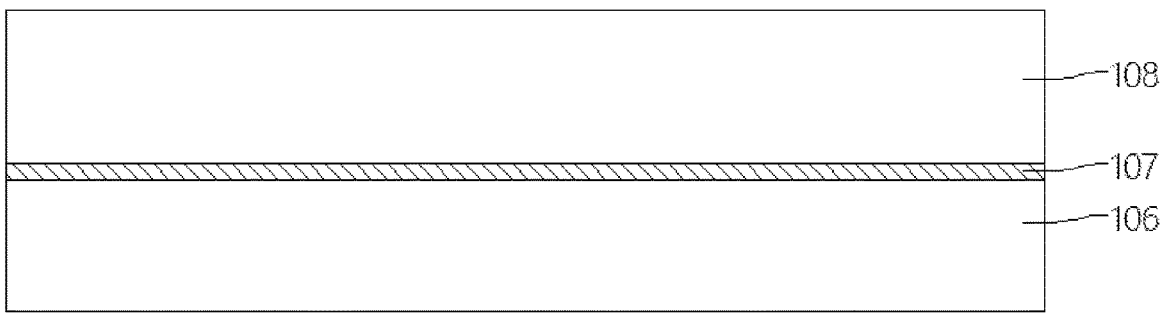
FIG. 1(b) shows a schematic structural diagram of a first base including one dielectric layer.

The silicon substrate 108, and the buried oxide layer 107 are structurally equivalent to the first substrate layer 101, and first dielectric layer 102, respectively; and the top silicon layer 106 is structurally equivalent to a structure consisting of the first device layer 103, second dielectric layer 104, and second device layer 105, as shown in FIG. 1(a) and FIG. 1(b).

Specifically, the first base can be a D-SOI substrate structure (including two dielectric layers), i.e., including the first substrate layer 101, first dielectric layer 102, first device layer 103, second dielectric layer 104, and second device layer 105, or it can be an SOI substrate structure (including one dielectric layer), i.e., including the silicon substrate 108, buried oxide layer 107, and top silicon layer 106. No matter what structure the first base adopts, it is fabricated with a universal process. The method is described herein using a D-SOI substrate as an example, and it should be understood that the same method can also be applied to SOI substrates.

Figure 2:
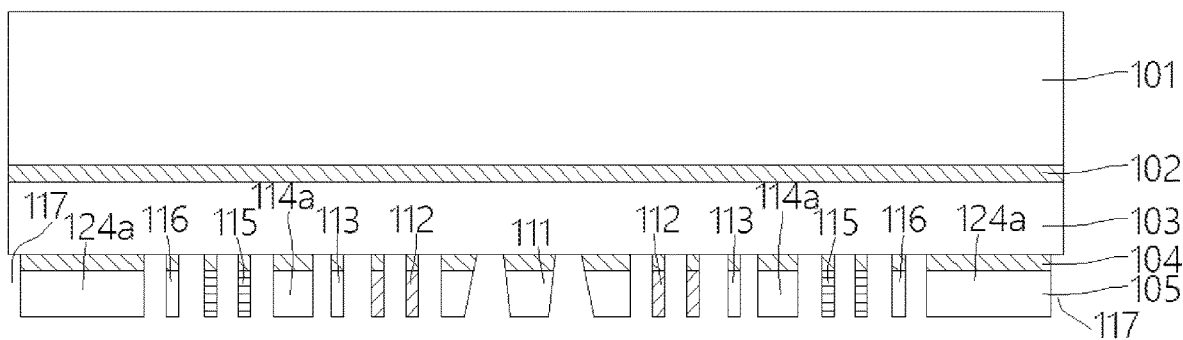
FIG. 2 shows a schematic structural diagram illustrating a step of etching a second dielectric layer 104 and a second device layer 105.

S12: etching the second dielectric layer 104 and the second device layer 105 to form a reinforcing rib 111, first movable combs 112, second movable combs 115, first elastic beams 113, second elastic beams 116, isolation grooves 117, first inner frames 114a, and first outer frames 124a, with the isolation grooves 117 located on the outside of the first inner frames 114a, as shown in FIG. 2.

Specifically, the reinforcing rib 111 is used to provide reinforcement support for a subsequently formed silicon layer 118 of a reflector to ensure device stability and effectively improve surface smoothness of the MEMS micromirror when the latter is still or moving.

Further, the first movable combs 112 are arranged along a first direction 11, the second movable combs 115 are located at the periphery of the first inner frames 114a and arranged along a second direction 12; the first elastic beams 113 are provided along the first direction 11 and connects the silicon layer of the reflector 118 and the first inner frames 114a, the second elastic beams 116 are provided along the second direction 12 and connects the first inner frames 114a and the first outer frames 124a.

Optionally, the reinforcing rib 111, the first movable combs 112, the second movable combs 115, the first elastic beams 113, and the second elastic beams 116 are formed at once to simplify the process.

Figure 3:
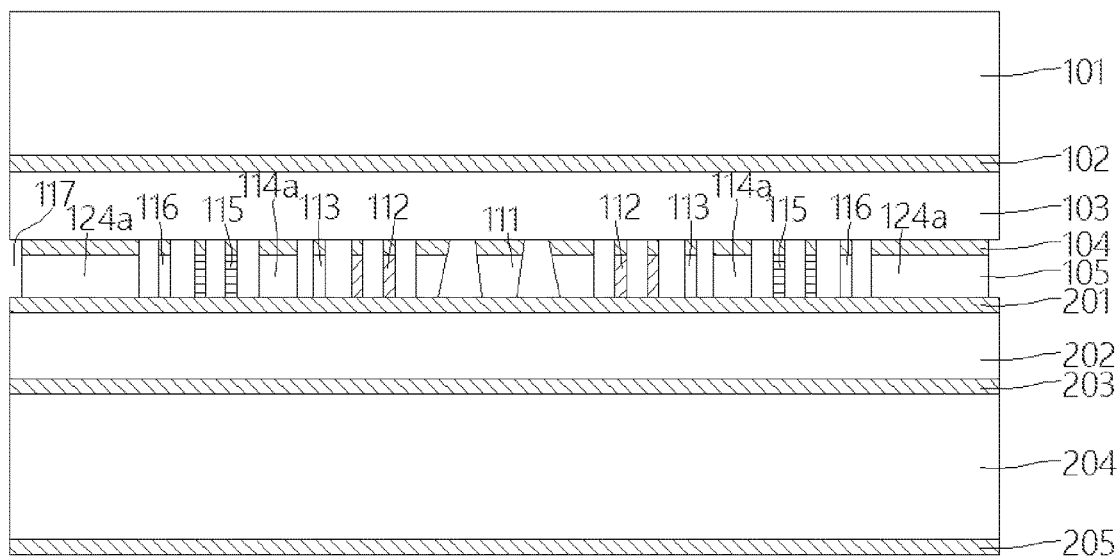
FIG. 3 shows a schematic structural diagram illustrating a step of bonding a second base.

S13: providing a second base, the second base comprises a third dielectric layer 201, a third device layer 202, a fourth dielectric layer 203, a second substrate layer 204, and a fifth dielectric layer 205 that are sequentially stacked, and bonding the third dielectric layer 201 to the second device layer 105, as shown in FIG. 3.

Specifically, the first substrate layer 101, and the second substrate layer 204 include materials such as silicon, germanium, etc., the first dielectric layer 102, the second dielectric layer 104, the third dielectric layer 201, the fourth dielectric layer 203, and the fifth dielectric layer 205 include insulating materials such as silicon oxide, silicon nitride, etc., and the first device layer 103, the second device layer 105, and the third device layer 202 include materials such as silicon, germanium, etc.

Further, the method comprises:

S14: removing the second substrate layer 204, the fourth dielectric layer 203, and the fifth dielectric layer 205 of the second base.

Figure 4:
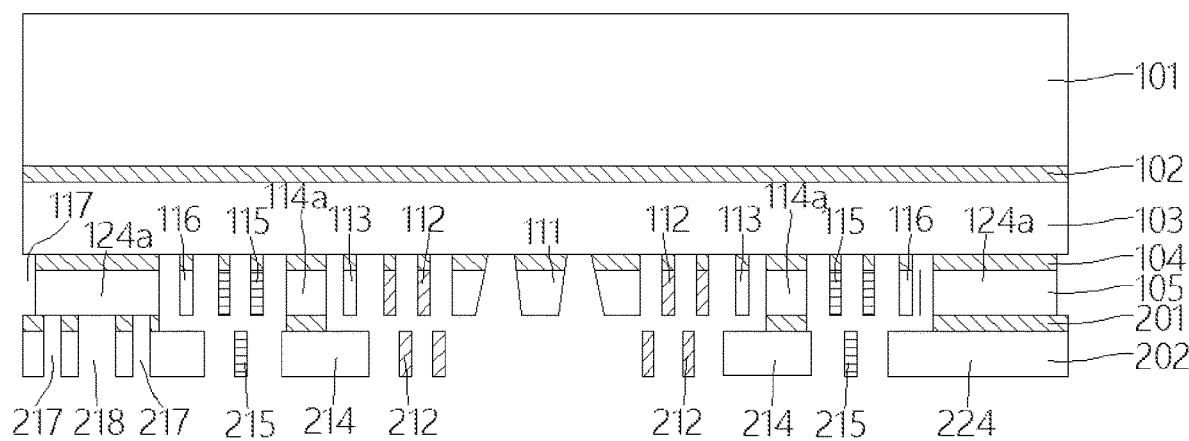
FIG. 4 shows a schematic structural diagram illustrating a step of etching a third dielectric layer 201 and a third device layer 202.

S15: etching the third device layer 202 and the third dielectric layer 201, to forma first fixed combs 212, a second fixed combs 215, a second inner frame 214, and a second outer frame 224 in the third device layer 202; wherein the first fixed combs 212 are located below and staggered with the first movable combs 112, and the second fixed combs 215 are located below and staggered with the second movable combs 115, as shown in FIG. 4.

Specifically, the first inner frame 114a and the second inner frame 214 are included in the inner frame 114, the first outer frame 124a and the second outer frame 224 are included in the outer frame 124, the first elastic beams 113 and the second elastic beams 116 serve as two rotation axes, respectively, force generated from interaction between the first fixed combs 212 and the first movable combs 112 serves as a driving force that enables the silicon layer of the reflector 118 to rotate within the inner frame 114 with the first elastic beams 113 as the axis of rotation; similarly, force generated from interaction between the second fixed combs 215 and the second movable combs 115 serves as a driving force that enables the inner frame 114 to rotate within the outer frame 124 with the second elastic beams 116 as the axis of rotation.

Specifically, the first fixed combs 212 and the first movable combs 112 are located below the silicon layer of the reflector 118, thus saving space and achieving a high duty cycle while obtaining a large deflection angle.

Embodiment 2

On the basis of Embodiment 1, the method further comprises:

S2: providing a base plate, bonding the base plate to the second base, wherein electrode through-holes are formed in the base plate to allow for electrical connections; a holding space is also formed in the base plate to provide room for the final device to operate.

Specifically, the step S2 comprises:

S21: etching the second outer frame 224 to form a first electrode groove 218 and first electrode insulation grooves 217 disposed around the first electrode groove 218, as shown in FIG. 4.

Specifically, step S21 is completed simultaneously with step S15.

Figure 5:
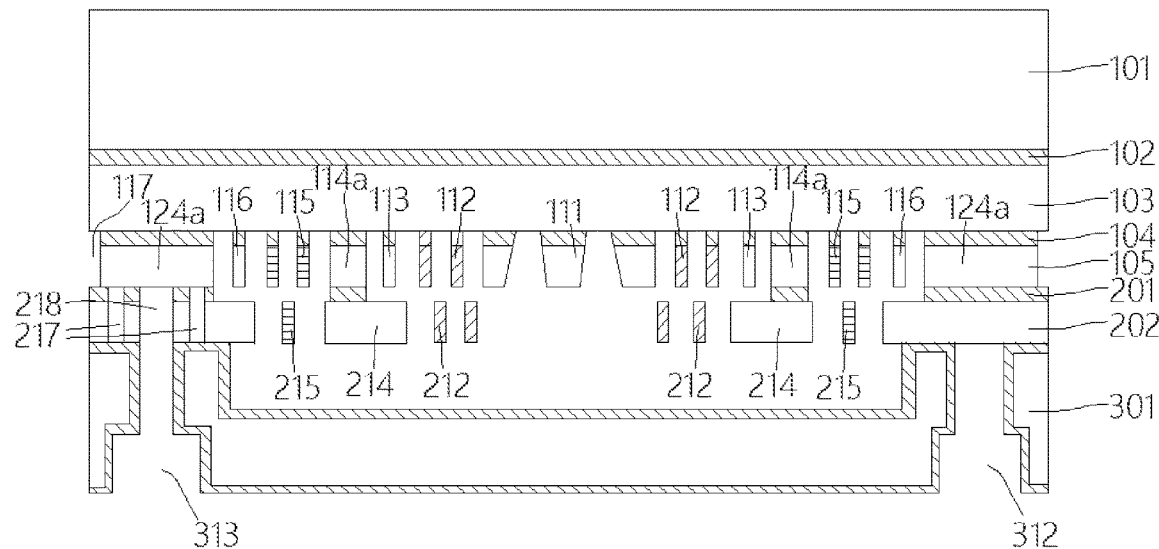
FIG. 5 shows a schematic structural diagram illustrating a step of bonding a third base.
Figure 6:
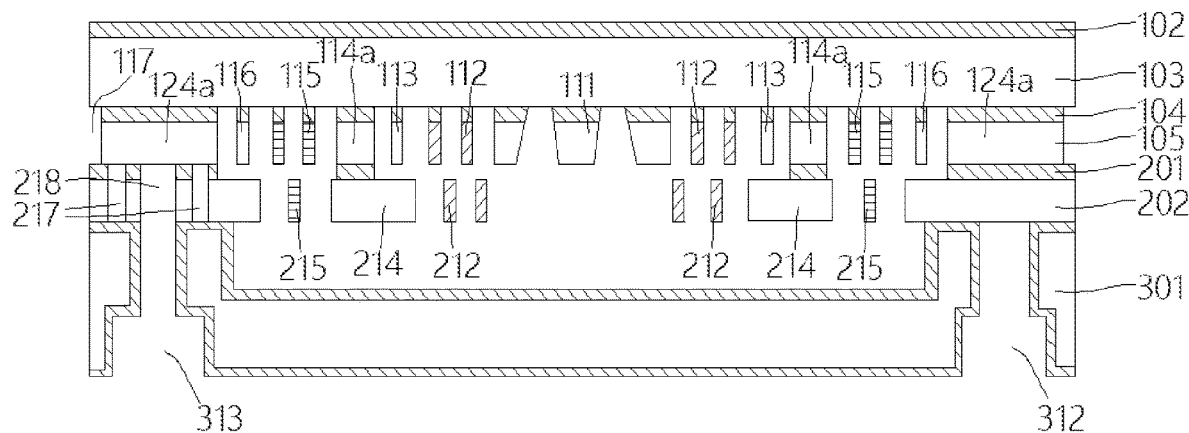
FIG. 6 shows a schematic structural diagram illustrating a step of removing a first substrate layer 101.

S22: the base plate introduced in S2 is a third base, wherein the third base comprises a fourth device layer 301 and a dielectric layer covering a surface of the fourth device layer 301, and the third base is bonded to the third device layer 202; the fourth device layer 301 comprises the electrode through-holes, the electrode through-holes comprise several first electrode through-holes 313 and several second electrode through-holes 312, the first electrode through-holes 313 are in communication with the first electrode groove 218, and surfaces of the first electrode through-holes 313 and second electrode through-holes 312 are covered with the dielectric layer, as shown in FIG. 5;

S23: removing the first substrate layer 101 of the first base, as shown in FIG. 6.

Figure 7:
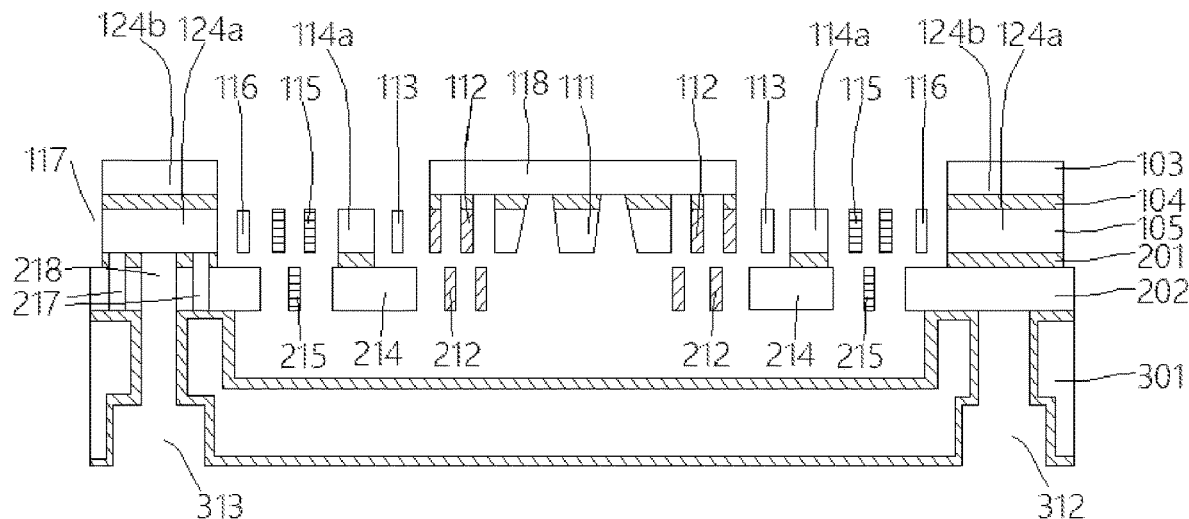
FIG. 7 shows a schematic structural diagram illustrating a step of etching a first device layer 103.

S24: etching the first dielectric layer 102 and the first device layer 103 to form a silicon layer of a reflector 118, and a third outer frame 124b; the first movable combs 112 are located below the silicon layer of the reflector 118 and the reinforcing rib 111 is located below the silicon layer of the reflector 118, as shown in FIG. 7; the third outer frame 124b is included in the outer frame 124.

The method further comprises:

S31: forming a metal layer of the reflector 119 by sputtering metal on an upper surface of the silicon layer of the reflector 118; wherein the metal layer 119 and the silicon layer 118 together constitute the reflector.

Figure 8:
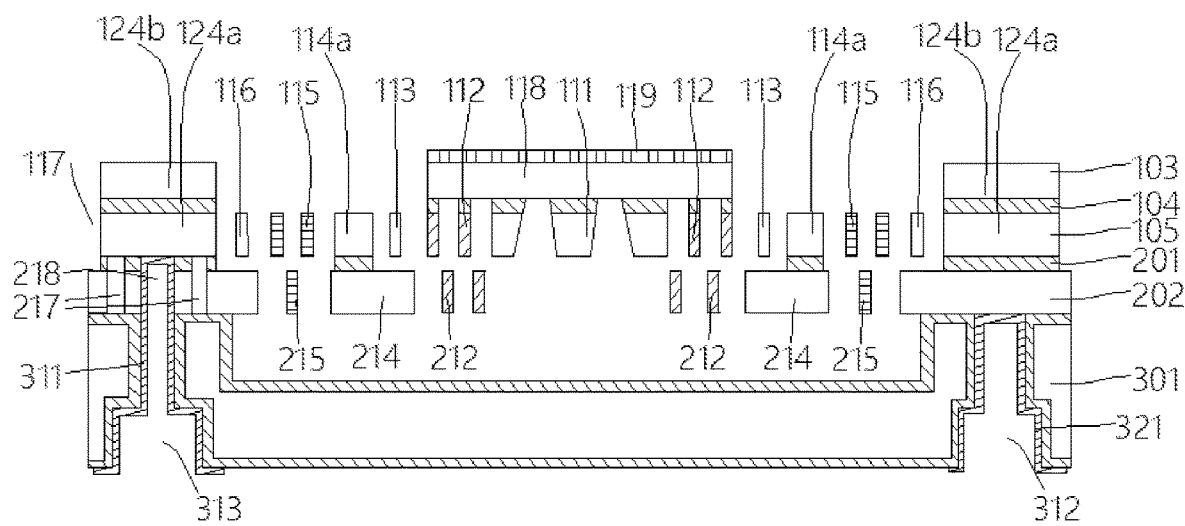
FIG. 8 shows a schematic structural diagram illustrating a step of sputtering metal to form a metal layer of a reflector 119, a first metal electrode 311, and a second metal electrode 321.

S32: forming a plurality of metal electrodes, which are electrically connected to the first movable combs, the second movable combs, the first fixed combs, and the second fixed combs, respectively. Specifically, S32 comprises: forming a first metal electrode 311 by sputtering metal on surfaces of the dielectric layer in the first electrode groove 218 and the first electrode through-hole 313, and forming a second metal electrode 321 by sputtering metal on surfaces of the dielectric layer in the second electrode through-hole 312, as shown in FIG. 8.

Optionally, the areas of top surfaces of the first electrode through-hole 313 and the second electrode through-hole 312 are smaller than the areas of corresponding bottom surfaces.

Specifically, the first electrode through-hole 313 and the second electrode through-hole 312 may be convex structures, and the first electrode through-hole 313 and the second electrode through-hole 312 may be cylindrical or prismatic.

Optionally, the third base is a concave structure to provide the holding space, i.e., an active space for the silicon layer of the reflector 118.

Specifically, there is only one first electrode through-hole 313, and therefore one first metal electrode 311 is formed; there are four second electrode through-holes 312, and therefore four second metal electrodes 321 are formed.

Specifically, the first metal electrode 311 is used as a common electrode for the first movable combs 112 and the second movable combs 115, and the four second metal electrodes 321 are used as electrodes for the first fixed combs 212 and the second fixed combs 215, respectively.

Embodiment 3

Figure 9:
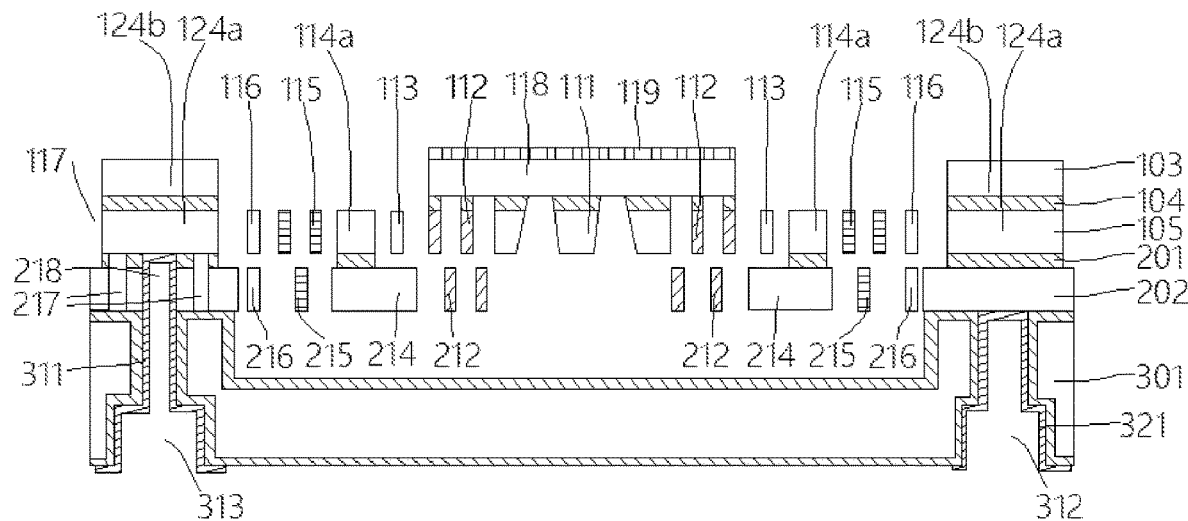
FIG. 9 shows a schematic structural diagram illustrating a step of forming additional second elastic beams 216.

Compared to Embodiment 1, this embodiment differs in that:

In step S15, after etching the third device layer 202 and the third dielectric layer 201, second additional elastic beams 216 located below the second elastic beams 116 are also formed, the final structure of the MEMS micromirror obtained after which is shown in FIG. 9.

Figure 10:
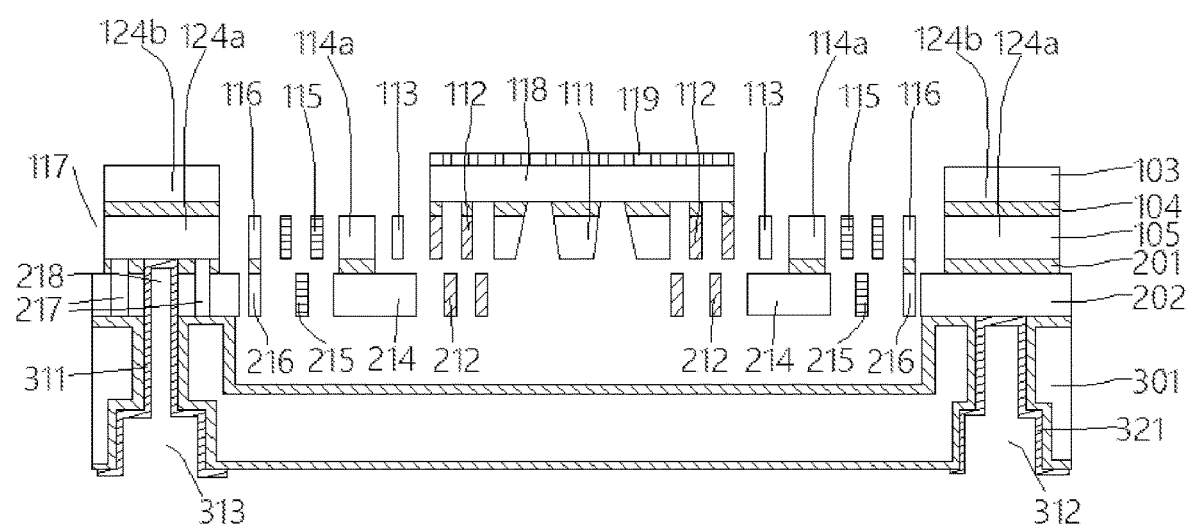
FIG. 10 shows a schematic structural diagram of a fourth dielectric layer 203 attached between second elastic beams 116 and additional second elastic beams 216.

Optionally, there is also a fourth dielectric layer 203 connected between the second elastic beams 116 and the second additional elastic beams 216, and a structure of the MEMS micromirror thereby obtained is shown in FIG. 10.

The second elastic beams 116 and the second additional elastic beams 216 act together as a rotation axis.

Embodiment 4

Figure 11:
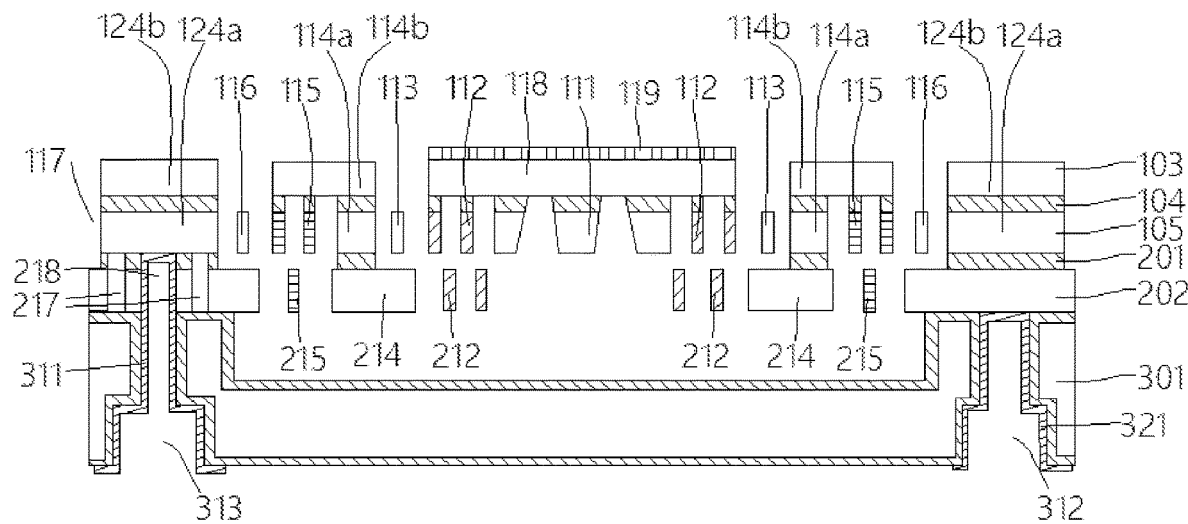
FIG. 11 shows a schematic structural diagram illustrating a step of forming hidden combs.

Compared to Embodiment 2, this embodiment differs in that:

In step S24, there are also formed third inner frames 114b located above the first inner frames 114a, and the third inner frames 114b extend over the second movable combs 115 to form hidden combs (i.e. the second movable combs 115 are hidden). And a structure of the MEMS micromirror thereby obtained is shown in FIG. 11.

Embodiment 5

Figure 12:
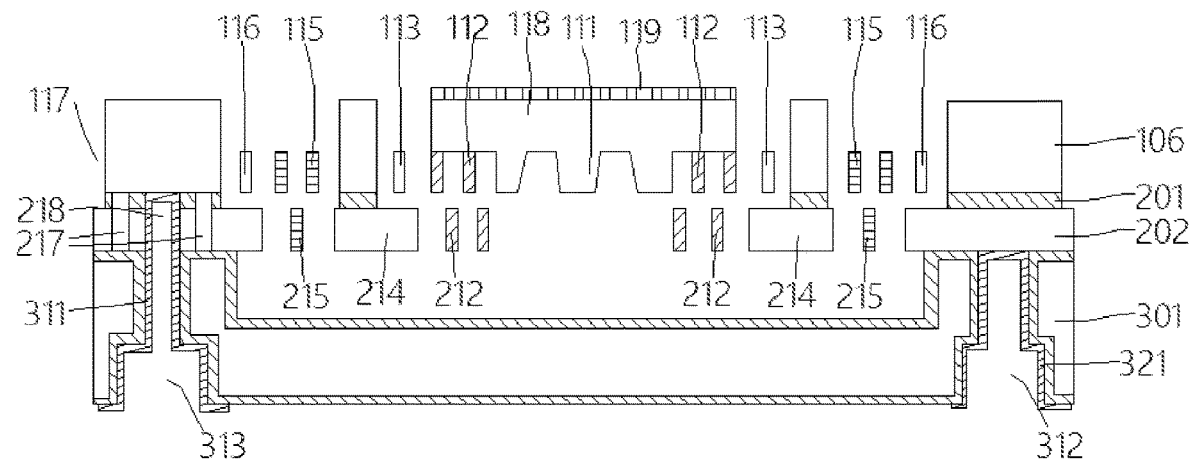
FIG. 12 shows a schematic structural diagram of a final structure of a MEMS micromirror obtained when its first base is an SOI substrate.

This embodiment is based on embodiment 1, and in this embodiment, when the first base in step S11 is an SOI substrate, a structure of the MEMS micromirror thereby obtained is shown in FIG. 12.

The isolation groove 117 runs through the top silicon layer 106 to achieve electrical isolation.

Embodiment 6

Figure 16:
FIG. 16 shows a schematic structural diagram of a fourth base.

Compared to embodiment 1, this embodiment further comprises:

S41: providing a base plate, forming a holding space, base plate insulation grooves, and insulating filling grooves in the base plate, with the base plate insulation grooves corresponding to the insulating filling grooves in the vertical direction, as shown in FIG. 16.

Figure 19:
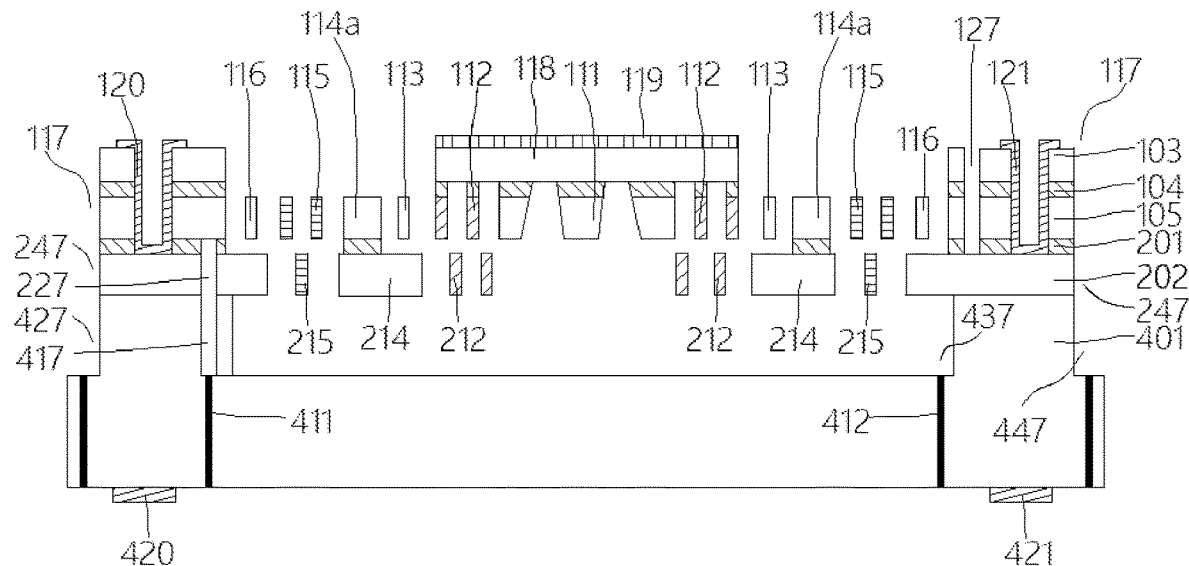
FIG. 19 shows a schematic structural diagram illustrating a step of forming a metal layer of a reflector 119, a third metal upper electrode 120, and a fourth metal upper electrode 121.

Specifically, the base plate is a fourth base 401 comprising the insulating filling grooves, the base plate insulation grooves, and the holding space. As an example, the insulating filling grooves extend in such a way that they correspond to or connect with the base plate insulation grooves, as shown in FIG. 19, and the insulating filling grooves include a first insulating filling groove 411, and a second insulating filling groove 412, the base plate insulation grooves include a first base plate insulation groove 417, a second plate base insulation groove 427, a third base plate insulation groove 437, and a fourth plate base insulation groove 447, wherein the second base plate insulation groove 427 and the fourth base plate insulation groove 447 are located on two sides of the fourth plate substrate 401, and the third base plate insulation groove 437 is connected to the holding space.

As another example, as shown in FIG. 20, the insulating filling grooves further include a third insulating filling groove 413, and a fourth insulating filling groove 414.

Figure 17:
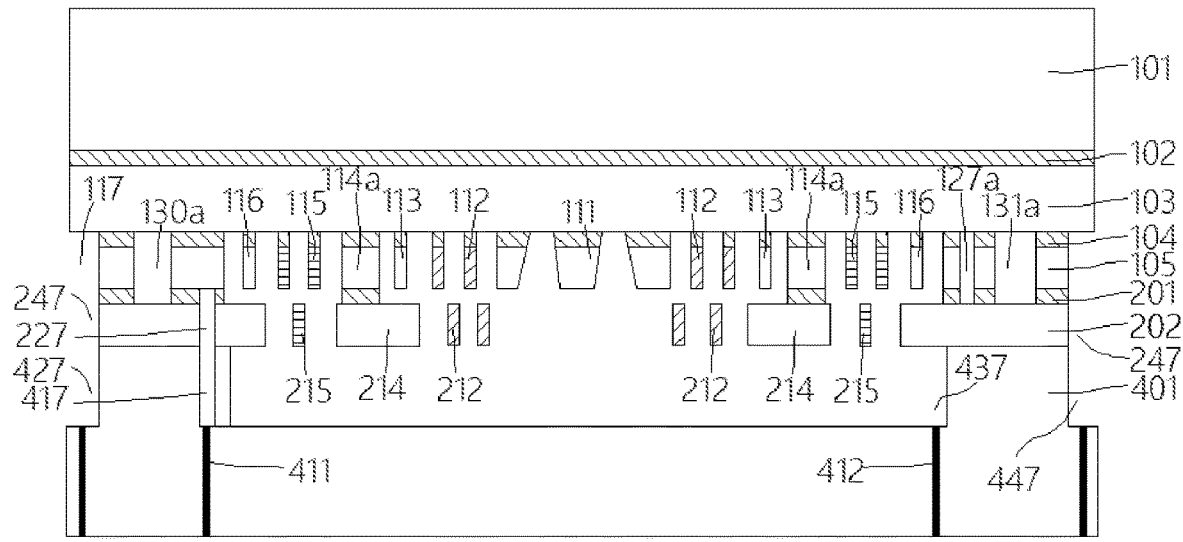
FIG. 17 shows a schematic structural diagram illustrating a step of bonding a fourth base to the structure in FIG. 15.

S42: fixing the base plate and the second base together by silicon-silicon bonding or metal bonding; specifically, the fourth base and the second base can be bonded together directly by silicon-silicon bonding or by a metal contact layer 403, as shown in FIGS. 17, 20; when bonded together by the metal contact layer 403, the metal bonding layer 403 is also provided with metal-layer gaps, i.e., a first metal layer gap 431 and a second metal layer gap 432, at locations corresponding to the insulating filling grooves.

Figure 13:
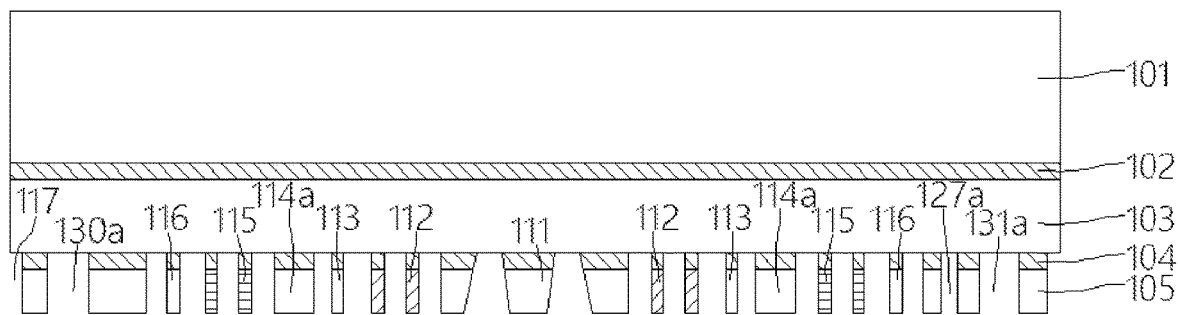
Figure 14:
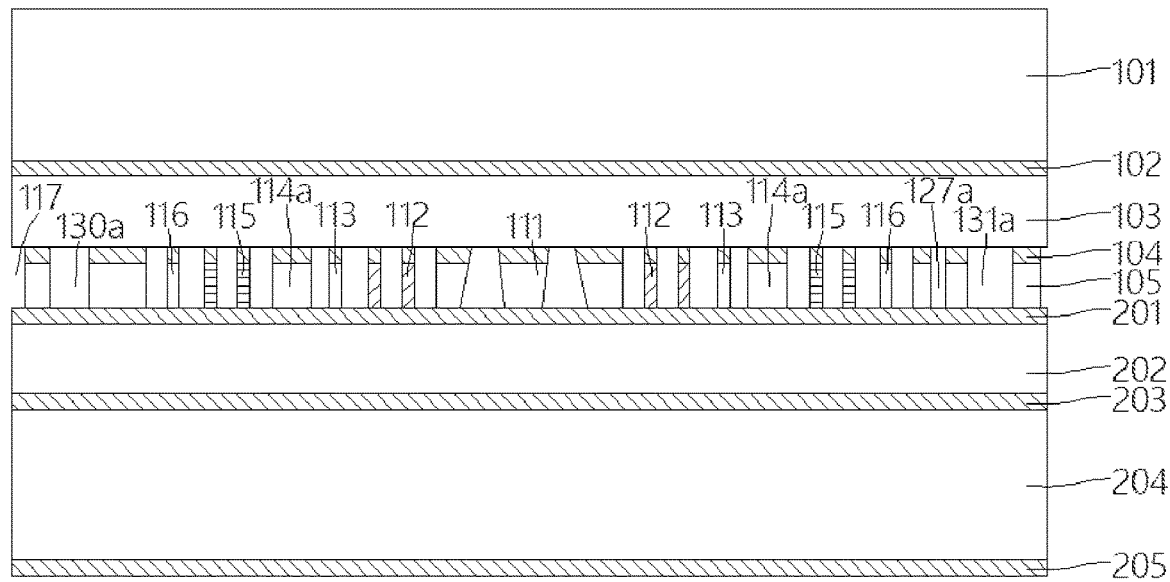
FIG. 14 shows a schematic structural diagram illustrating a step of bonding a second base to the structure in FIG. 13.
Figure 15:
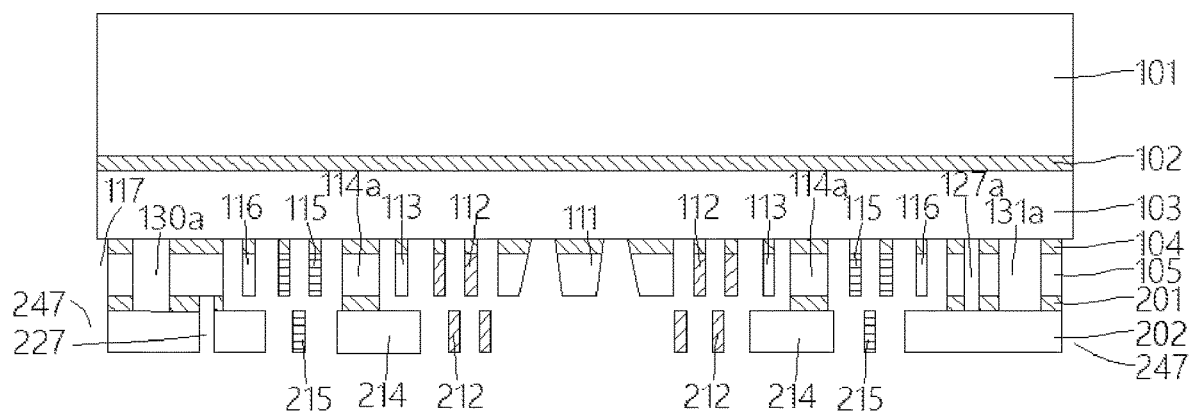
FIG. 15 shows a schematic structural diagram illustrating a step of etching a second base according to Embodiment 6.

The steps of bonding and etching of the first base and the second base in this embodiment are similar to those in Embodiment 1, which can be referred to in FIGS. 13-15.

Specifically, the third device layer 202 is further formed with an A-type electrode insulation groove 227 and electrode edge insulation grooves 247 located at the edge, with the A-type electrode insulation groove 227 connected to the first base plate insulation groove 417 to form a third electrode insulation groove.

The method further comprises:

S51: removing the first substrate layer 101 of the first base, as shown in FIG. 17.

Figure 18:
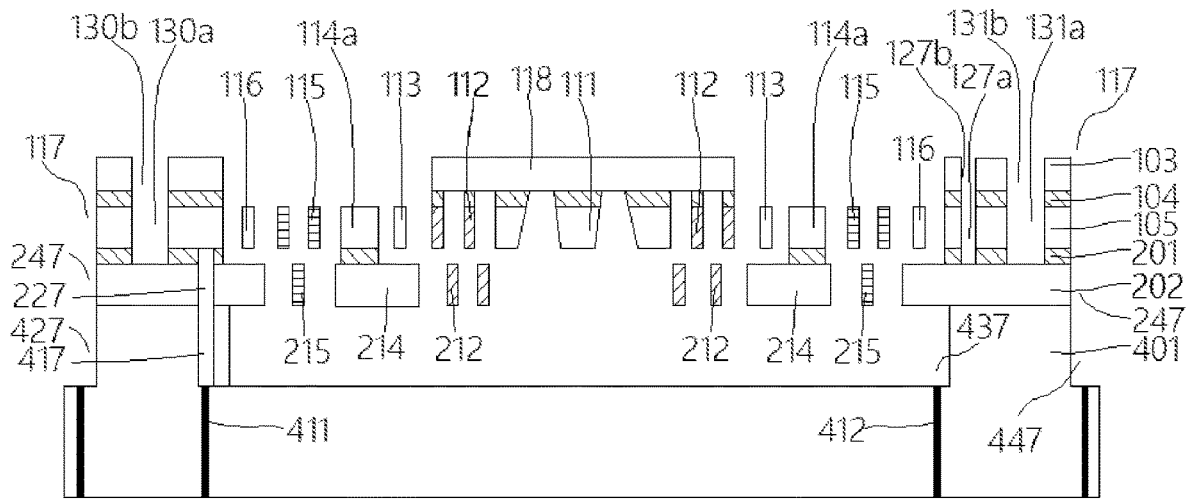
FIG. 18 shows a schematic structural diagram illustrating a step of forming an upper part of a third electrode through-hole 130b, an upper part of a fourth electrode through-hole 131b, and an upper part of a fourth electrode insulation groove 127b.

S52: etching the first dielectric layer 102 and the first device layer 103 to form a silicon layer of a reflector 118, third outer frames 124b, and upper parts of electrode through-holes (the upper parts of electrode through-holes include an upper part of a third electrode through-hole 130b and an upper part of a fourth electrode through-hole 131b); the first movable combs 112 are located on two lower sides of the silicon layer of the reflector 118, and the reinforcing rib is located below the silicon layer of the reflector 118, as shown in FIG. 18.

S53: forming a metal layer of the reflector on an upper surface of the silicon layer of the reflector, as shown in FIG. 19.

The method further comprises:

S6: forming a plurality of upper and lower metal electrodes, wherein the plurality of metal electrodes are electrically connected to the first movable combs, second movable combs, first fixed combs, and second fixed corms, respectively.

Step S6 specifically comprises:

forming a lower part of the third electrode through-hole 130a, a lower part of the fourth electrode through-hole 131a in the first outer frame 124a; wherein the lower part of the third electrode through-hole 130a, and the lower part of the fourth electrode through-hole 131a are correspondingly communicated with the upper part of the third electrode through-hole 130b, and the upper part of the fourth electrode through-hole 131b, respectively;

wherein, the lower part of the third electrode through-hole 130a and the upper part of the third electrode through-hole 130b form the third electrode through-hole 130, and the lower part of the fourth electrode through-hole 131a and the upper part of the fourth electrode through-hole 131b form the fourth electrode through-hole 131;

forming electrode insulation grooves around the third electrode through-hole 130, and electrode insulation grooves around the fourth electrode through-hole 131 on the outer frame 124;

wherein the insulating filling grooves extend in such a way that they correspond to or connect with the base plate insulation grooves, and the base plate insulation grooves vertically correspond to or connect with the electrode insulation grooves, or the insulating filling grooves vertically correspond to or connect with the electrode insulation grooves.

A third metal upper electrode 120 and a fourth metal upper electrode 121 are formed on surfaces of the third electrode through-hole and the fourth electrode through-hole, respectively; and a third metal lower electrode 420 and a fourth metal lower electrode 421 are formed in the area enclosed by the insulating filling grooves, located at a bottom surface of the fourth base, thereby forming the lower and upper metal electrodes. The third metal upper electrode 120 and the third metal lower electrode 420 constitute a third metal electrode. The fourth metal upper electrode 121 and the fourth metal lower electrode 421 constitute a fourth metal electrode.

As an example, as shown in FIG. 19, the electrode insulation grooves located in the outer frame 124 around the third electrode through-hole include the isolation groove 117, the A-type electrode insulation groove 227, and the electrode edge insulation groove 247; and the electrode insulation grooves located around the fourth electrode through-hole include the isolation groove 117, the electrode edge insulation groove 247, and the fourth electrode insulation groove 127.

The insulating filling grooves include the first insulating filling groove 411, and the second insulating filling groove 412, the base plate insulation grooves include the first base plate insulation groove 417, the second base plate insulation groove 427, the third base plate insulation groove 437, and the fourth base plate insulation groove 447, the second base plate insulation groove 427, the fourth base plate insulation groove 447 are located on two sides of the fourth base 401, and the third base plate insulation groove 437 is connected to the holding space. The insulating fill grooves extend in such a way that they correspond to or connect with the base plate insulation grooves 417. The insulating filling grooves extend in such a way that they correspond to or connect with the base plate insulation grooves and the base plate insulation grooves vertically correspond or connect with the electrode insulation grooves.

As another example, the electrode insulation grooves located in the outer frame 124 around the third electrode through-hole as shown in FIG. 20 include the isolation groove 117, a B type insulation groove 237, and the electrode insulation grooves located around the fourth electrode through-hole include the isolation groove 117, and the fourth electrode insulation groove 127.

The insulating filling grooves include the third insulating filling groove 413, and the fourth insulating filling groove 414; the insulating filling grooves vertically correspond to or connect with the electrode insulation grooves.

In addition, the MEMS micromirror with the second additional elastic beams 216 in Embodiment 3, and the one with the third inner frames 114b in Embodiment 4 can also be implemented in this embodiment.

Embodiment 7

This embodiment provides a MEMS micromirror with a high duty cycle, and the MEMS micromirror comprises a first base, a second base, and a base plate, which are sequentially stacked; the first base comprises a stacked structure comprising a first device layer 103, a second dielectric layer 104, and a second device layer 105, or the first substrate comprises a top silicon layer 106.

The top silicon layer 106 is structurally equivalent to a structure consisting of the first device layer 103, second dielectric layer 104, and second device layer 105, as shown in FIG. 1(a) and FIG. 1(b)

Specifically, the first substrate may be a D-SOI substrate structure (including two dielectric layers), i.e., including the first substrate layer 101, first dielectric layer 102, first device layer 103, second dielectric layer 104, and second device layer 105, or it may be an SOI substrate (including one dielectric layer), i.e., including the silicon substrate 108, buried oxide layer 107, and top silicon layer 106. No matter what structure the first base adopts, it is fabricated with a universal process. The MEMS micromirror is described below using a D-SOI substrate as an example, and it should be understood that the same method can also be applied to SOI substrates.

Further, the second device layer 105 is formed with a reinforcing rib 111, first movable combs 112, second movable combs 115, first elastic beams 113, second elastic beams 116, isolation grooves 117, first inner frames 114a, and first outer frames 124a.

Specifically, the reinforcing rib 111 is used to provide reinforcement support for a subsequently formed under-reflector silicon layer 118 to ensure device stability and effectively improve surface smoothness of the MEMS micromirror when the latter is still or moving.

Further, the first movable combs 112 are arranged along a first direction 11, the second movable combs 115 are located at the periphery of the first inner frames 114a and arranged along a second direction 12; the first elastic beams 113 are provided along the first direction 11 and connects the silicon layer of the reflector 118 and the first inner frames 114a, the second elastic beams 116 are provided along the second direction 12 and connects the first inner frames 114a and the first outer frames 124a.

Optionally, the reinforcing rib 111, the first movable combs 112, the second movable combs 115, the first elastic beams 113, and the second elastic beams 116 are formed at once to simplify the process.

The second base is located below the first base, the second base comprises a third dielectric layer 201, and a third device layer 202, which are sequentially stacked; the dielectric layer 201 is bonded to the second device layer 105; the third device layer 202 is formed with first fixed combs 212, second fixed combs 215, a second inner frame 214, and a second outer frame 224.

The first fixed combs 212 are located below and staggered with the first movable combs 112, and the second fixed combs 215 are located below and staggered with the second movable combs 115.

Further, the first device layer 103 is formed with a silicon layer of a reflector 118, and a third outer frame 124b; the first movable combs 112 are located on two lower sides of the silicon layer of the reflector 118, and the reinforcement rib is located below the silicon layer of the reflector 118.

Specifically, the first inner frame 114a and the second inner frame 214 form the inner frame 114, the first outer frame 124a, the second outer frame 224, and the third outer frame 124b form the outer frame 124, the first elastic beams 113 and the second elastic beams 116 serve as two rotation axes, respectively; force generated from interaction between the first fixed combs 212 and the first movable combs 112 serves as a driving force that enables the silicon layer of the reflector 118 to rotate within the inner frame 114 with the first elastic beams 113 as the axis of rotation; similarly, force generated from interaction between the second fixed combs 215 and the second movable combs 115 serves as a driving force that enables the inner frame 114 to rotate within the outer frame 124 with the second elastic beams 116 as the axis of rotation.

Further, a metal layer of the reflector 119 on the surface of the silicon layer of the reflector 118 is formed by metal sputtering.

Specifically, the first fixed combs 212, the first movable combs 112 are located below the silicon layer of the reflector 118, thereby saving space and achieving a high duty cycle while obtaining a large deflection angle.

The base plate is located below the second base with a holding space formed in the base plate to provide room for the final device to operate.

The MEMS micromirror further comprises a plurality of metal electrodes, which are electrically connected to the first movable combs, the second movable combs, the first fixed combs, and the second fixed combs, respectively.

The MEMS micromirror may further comprise the following structures:

(1) Optionally, as shown in FIG. 8, the base plate is a third base comprising several first electrode through-holes 313, several second electrode through-holes 312, and the holding space, wherein inner surfaces of the first electrode through-holes 313 and the second electrode through-holes 312 are covered with a dielectric layer; the second outer frame 224 is formed with a first electrode groove 218 and a first electrode insulation groove 217 around the first electrode groove 218, and the first electrode through-hole 313 is communicated with the first electrode groove 218; a first metal electrode 311 is formed on a surface of the dielectric layer on the first electrode groove 218 and the first electrode through-hole 313, and a second metal electrode 321 is formed on the surface of the dielectric layer on the second electrode through-hole 312, thereby forming the metal electrodes.

Specifically, the third base comprises a fourth device layer 301 and a dielectric layer covering a surface of the fourth device layer 301, with the third base bonded to the third device layer 202.

Optionally, the areas of top surfaces of the first electrode through-hole 313 and the second electrode through-hole 312 are smaller than the areas of corresponding bottom surfaces;

Specifically, the first electrode through-hole 313 and the second electrode through-hole 312 may be convex structures, and the first electrode through-hole 313 and the second electrode through-hole 312 may be cylindrical or prismatic.

Optionally, the third base is a concave structure to provide the holding space, i.e., an activity space for the silicon layer of the reflector 118.

Specifically, there is only one first electrode through-hole 313, and therefore one first metal electrode 311 is formed; there are four second electrode through-holes 312, and therefore four second metal electrodes 321 are formed.

Specifically, the first metal electrode 311 is used as a common electrode for the first movable combs 112 and the second movable combs 115, and the four second metal electrodes 321 are used as electrodes for the first fixed combs 212 and the second fixed combs 215, respectively.

(2) Further, the fourth dielectric layer 203 is further formed with second additional elastic beams 216 disposed in a lower part of the second elastic beams 116, with the second elastic beams 116 and the second additional elastic beams 216 isolated from each other (as shown in FIG. 9) or connected by a dielectric layer (i.e., the fourth dielectric layer 203, as shown in FIG. 10).

The second elastic beams 116 and the second additional elastic beams 216 act together as a rotation axis.

(3) Further, as shown in FIG. 11, third inner frames 114b are also formed above the first inner frames 114a, and the third inner frames 114b extend over the second movable combs 115 to form hidden combs (i.e. the second movable combs 115 are hidden).

(4) Further, when the first base is a top silicon layer 106, a final structure of the MEMS micromirror thereby obtained is shown in FIG. 12.

The isolation groove 117 runs through the top silicon layer 106 to achieve electrical isolation.

(5) Optionally, the base plate is a fourth base comprising an insulating filling groove, base plate insulation grooves, and the holding space, wherein a lower part of a third electrode through-hole 130a, and a lower part of a fourth electrode through-hole 131a are also formed in the first outer frames 124a.

The third outer frames 124b are further formed with an upper part of the third electrode through-hole 130b and an upper part of the fourth electrode through-hole 131b; the lower part of the third electrode through-hole 130a, and the lower part of the fourth electrode through-hole 131a are correspondingly communicated with the upper part of the third electrode through-hole 130b, and the upper part of the fourth electrode through-hole 131b, respectively.

The lower part of the third electrode through-hole 130a and the upper part of the third electrode through-hole 130b form the third electrode through-hole 130, and the lower part of the fourth electrode through-hole 131a and the upper part of the fourth electrode through-hole 131b form the fourth electrode through-hole 131.

On the outer frame 124, electrode insulation grooves are formed around the third electrode through-hole and the fourth electrode through-hole.

The insulating filling grooves extend in such a way that they correspond to or connect with the base plate insulation grooves, and the base plate insulation grooves vertically correspond to or connect with the electrode insulation grooves, or the insulating filling grooves vertically correspond to or connect with the electrode insulation grooves. The third electrode through-hole and the fourth electrode through-hole have a third metal upper electrode 120 and a fourth metal upper electrode 121 formed on their surfaces respectively. A third metal lower electrode 420 and a fourth metal lower electrode 421 are formed in the area enclosed by the insulating filling grooves, located at a bottom surface of the fourth base, thereby forming the lower and upper metal electrodes.

Optionally, the fourth base and the second base may be bonded together directly by silicon-silicon bonding or by metal contact layer 403, as shown in FIGS. 19-20. When bonded together by the metal contact layer 403, the metal bonding layer 403 is provided with metal-layer gaps, i.e., a first metal layer gap 431 and a second metal layer gap 432, at locations corresponding to the insulating fill grooves.

As an example, as shown in FIG. 19, the electrode insulation grooves located in the outer frame 124 around the third electrode through-hole include the isolation groove 117, the A-type electrode insulation groove 227, and the electrode edge insulation groove 247; and the electrode insulation grooves located around the fourth electrode through-hole include the isolation grooves 117, the electrode edge insulation groove 247, and the fourth electrode insulation groove 127.

The insulating filling grooves include the first insulating filling groove 411, and the second insulating filling groove 412, the base plate insulation grooves include the first base plate insulation groove 417, the second base plate insulation groove 427, the third base plate insulation groove 437, and the fourth base plate insulation groove 447, the second base plate insulation groove 427, the fourth base plate insulation groove 447 are located on two sides of the fourth base 401, and the third base plate insulation groove 437 is connected to the holding space. The insulating filling grooves extend in such a way that they correspond to or connect with the base plate insulation grooves 417. The insulating filling grooves extend in such away that they correspond to or connect with the base plate insulation grooves and the base plate insulation grooves vertically correspond or connect with the electrode insulation grooves.

Specifically, the isolation groove 117, the electrode edge insulation groove 247, the second base plate insulation groove 427, and the first insulating filling groove 411 are interconnected, and the isolation groove 117, the electrode edge insulation groove 247, the fourth base plate insulation groove 447, and the second insulating filling groove 412 are interconnected, thereby achieving electrical isolation of the MEMS micromirror from the exterior. The A-type electrode insulation groove 227 is connected to the first base plate insulation groove 417 to form a third electrode insulation groove; the third electrode insulation groove, and the fourth electrode insulation groove 127 are used to achieve electrical isolation between the combs.

As another example, the electrode insulation grooves located in the outer frame 124 around the third electrode through-hole as shown in FIG. 20 include the isolation groove 117, and a B type insulation groove 237, and the electrode insulation grooves located around the fourth electrode through-hole include the isolation groove 117, and the fourth electrode insulation groove 127.

The insulating filling grooves include the third insulating filling groove 413, and the fourth insulating filling groove 414; the insulating filling grooves vertically correspond to or connect with the electrode insulation grooves.

Optionally, as shown in FIG. 20, there are also formed third inner frames 114b disposed above the first inner frames 114a.

It should be noted that the upper and lower metal electrodes in this embodiment can not only be applied in structure (5), but can also be applied in structures (1)-(4) described above, which can be achieved by providing corresponding upper electrodes in the outer frame with reference to structure (5) and the corresponding method.

Embodiment 8

Figure 22:
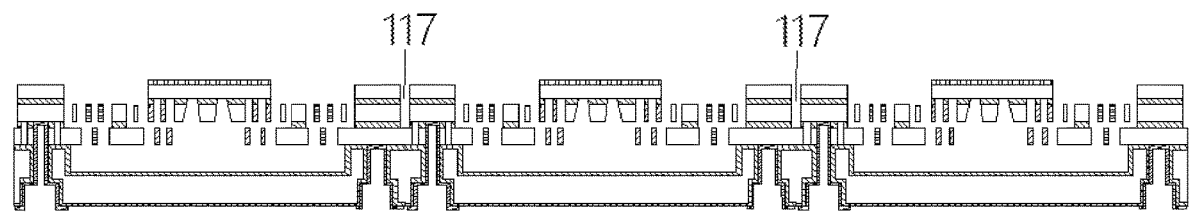
FIG. 22 shows a schematic structural diagram of a MEMS micromirror array.

The present embodiment provides a MEMS micromirror array, as shown in FIG. 22, wherein the MEMS micromirror array is an array of several MEMS micromirror with a high duty cycle as described in Embodiment 7 arranged and combined along the first direction 11 and/or the second direction 12, and the MEMS micromirror with a high duty cycle are electrically isolated from each other by one or more of the isolation groove 117, the electrode insulation grooves, the base plate insulation grooves, and the insulating filling grooves.

In summary, the present disclosure provides a MEMS micromirror with a high duty cycle, micromirror array, and preparation method thereof, wherein the first movable combs and the fixed combs of the MEMS micromirror are located under the silicon layer of a mirror, which improves the duty cycle of the MEMS micromirror and effectively reduces the size of the MEMS micromirror while achieving large angle deflection in two directions. The silicon layer of the reflector has a reinforcing rib underneath, which effectively improves surface smoothness of the MEMS micromirror when the latter is still or moving. In addition, the MEMS micromirror of the present disclosure has a variety of electrode lead-out forms including a double-sided electrode structure, and the electrode lead-out form during actual implantation can be selected as needed, which is conducive to the commercialization of MEMS micromirrors and micromirror arrays. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Any person skilled in the art may modify or change the above embodiments without violating the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A MEMS micromirror with a high duty cycle, wherein the MEMS micromirror comprises: a first base, a second base, and a base plate stacked in sequence;
    wherein the first base comprises a reinforcing rib, first movable combs, second movable combs, a first elastic beam, a second elastic beam, an isolation groove, a first inner frame, a first outer frame, a silicon layer of a reflector, a third outer frame, with the first movable combs located below the silicon layer of the reflector and the reinforcing rib located below the silicon layer of the reflector;
    wherein the second base is located below the first base, and comprises first fixed combs, second fixed combs, a second inner frame, and a second outer frame;
    wherein the first fixed combs are located below the first movable combs and are staggered with the first movable combs, the second fixed combs are located below the second movable combs and are staggered with the second movable comb; the first inner frame and the second inner frame forms an inner frame; the first outer frame, the second outer frame, and the third outer frame form an outer frame;
    wherein the base plate is located below the second base with a holding space formed in the base plate to provide room for the final device to operate;
    wherein the MEMS micromirror also comprises a metal layer of the reflector, disposed on an upper surface of the silicon layer of the reflector;
    wherein the MEMS micromirror also comprises a plurality of metal electrodes electrically connected to the first movable combs, the second movable combs, the first fixed combs, and the second fixed combs, respectively.

2. The MEMS micromirror according to claim 1, wherein the first movable combs are arranged in a first direction and the second movable combs are located at a periphery of the first inner frame and arranged in a second direction; the first elastic beam is arranged in the first direction and connects the silicon layer of the reflector and the first inner frame, and the second elastic beam is arranged in the second direction and connects the first inner frame and the first outer frame.

3. The MEMS micromirror according to claim 1, further comprising a second additional elastic beam disposed in a lower part of the second elastic beam, wherein the second elastic beam and the second additional elastic beam are isolated from each other or connected by a dielectric layer.

4. The MEMS micromirror according to claim 1, further comprising a third inner frame disposed above the first inner frame, wherein the third inner frame extends over the second movable combs to form hidden combs.

5. The MEMS micromirror according to claim 1, wherein the base plate is a third base comprising several first electrode through-holes, several second electrode through-holes, and the holding space, wherein surfaces of the first electrode through-holes and the second electrode through-holes are covered with a dielectric layer; wherein the second outer frame is formed with a first electrode groove and a first electrode insulation groove around the first electrode groove, and the first electrode through-hole is communicated with the first electrode groove; a first metal electrode is formed on a surface of the dielectric layer on the first electrode groove and the first electrode through-hole, and a second metal electrode is formed on a surface of the dielectric layer on the second electrode through-hole, thereby forming the metal electrodes.

6. The MEMS micromirror according to claim 1, wherein the base plate is a fourth base comprising a plurality of insulating filling grooves, a plurality of base plate insulation grooves, and the holding space, wherein a lower part of a third electrode through-hole, and a lower part of a fourth electrode through-hole are formed in the first outer frame;
    wherein the third outer frame is formed with an upper part of the third electrode through-hole and an upper part of the fourth electrode through-hole, which are correspondingly communicated with the lower part of the third electrode through-hole, and the lower part of the fourth electrode through-hole;
    wherein the lower part of the third electrode through-hole and the upper part of the third electrode through-hole form the third electrode through-hole, and the lower part of the fourth electrode through-hole and the upper part of the fourth electrode through-hole form the fourth electrode through-hole;
    wherein on the outer frame, electrode insulation grooves are formed around the third electrode through-hole and the fourth electrode through-hole;
    wherein the insulating filling grooves extend in such a way that they correspond to or connect with the base plate insulation grooves, and the base plate insulation grooves vertically correspond to or connect with the electrode insulation grooves, or the insulating filling grooves vertically correspond to or connect with the electrode insulation grooves;
    wherein a third metal upper electrode and a fourth metal upper electrode are formed on surfaces of the third electrode through-hole and the fourth electrode through-hole, respectively; wherein a third metal lower electrode and a fourth metal lower electrode are formed in an area enclosed by the insulating filling grooves, located at a bottom surface of the fourth base, thereby forming the lower and upper metal electrodes.

7. The MEMS micromirror according to claim 1, wherein a plurality of the MEMS micromirrors is arranged in a first direction and/or a second direction and forms an array.

8. A method for preparing a MEMS micromirror with a high duty cycle, comprising:
    providing a first base, wherein the first base comprises a stacked structure comprising a first substrate layer, a first dielectric layer, a first device layer, a second dielectric layer, and a second device layer stacked in sequence;
    etching the second device layer and the second dielectric layer to form a reinforcing rib, first movable combs, second movable combs, a first elastic beam, a second elastic beam, an isolation groove, a first inner frame, and a first outer frame;

providing a second base, wherein the second base comprises a third dielectric layer, and a third device layer sequentially stacked, and bonding the second base to the first substrate;

etching the third device layer and the third dielectric layer, forming in the third device layer first fixed combs, second fixed combs, a second inner frame, and a second outer frame; wherein the first fixed combs are located below and staggered with the first movable combs, and the second fixed combs are located below and staggered with the second movable comb;

providing a base plate, bonding the base plate to the second base, wherein electrode through-holes are formed in the base plate to allow for electrical connections; a holding space is also formed in the base plate to provide room for the final device to operate;

etching the first device layer and the first dielectric layer to form a silicon layer of a reflector, and a third outer frame, wherein the first movable combs are located below the silicon layer of the reflector and the reinforcing rib is located below the silicon layer of the reflector;

forming a metal layer of the reflector on an upper surface of the silicon layer of the reflector;

forming a plurality of metal electrodes, which are electrically connected to the first movable combs, the second movable combs, the first fixed combs, and the second fixed combs, respectively.

9. A method for preparing a MEMS micromirror with a high duty cycle, comprising:

providing a base plate, forming in the base plate a holding space, insulating filling grooves and base plate insulation grooves, with the base plate insulation grooves vertically corresponding to the insulating filling grooves;

providing a first base, wherein the first base comprises a stacked structure comprising a first substrate layer, a first dielectric layer, a first device layer, a second dielectric layer, and a second device layer stacked in sequence;

etching the second device layer to form a reinforcing rib, first movable combs, second movable combs, a first elastic beam, a second elastic beam, an isolation groove, lower parts of electrode through-holes, a first inner frame, and a first outer frame;

providing a second base, wherein the second base comprises a third dielectric layer, and a third device layer sequentially stacked, and bonding the second base to the first base;

etching the third device layer and the third dielectric layer, forming in the third device layer first fixed combs, second fixed combs, an insulation groove, a second inner frame, and a second outer frame; wherein the first fixed combs are located below and staggered with the first movable combs, and the second fixed combs are located below and staggered with the second movable combs;

wherein the base plate and the second base are fixed together by metal bonding or silicon-silicon bonding;

etching the first device layer and the first dielectric layer to form a silicon layer of a reflector, and a third outer frame, and upper parts of electrode through-holes, wherein the first movable combs are located below the silicon layer of the reflector and the reinforcing rib is located below the silicon layer of the reflector;

forming a metal layer of the reflector on an upper surface of the silicon layer of the reflector;

forming a plurality of upper and lower metal electrodes, wherein the plurality of metal electrodes are electrically connected to the first movable combs, the second movable combs, the first fixed combs, and the second fixed combs, respectively.

10. The method of preparing a MEMS micromirror according to claim 8, wherein a second additional elastic beam is also formed and located in a lower part of the second elastic beam, wherein the second additional elastic beam is formed during etching of the third device layer and the third dielectric layer.

11. The method of preparing a MEMS micromirror according to claim 9, wherein a second additional elastic beam is also formed and located in a lower part of the second elastic beam, wherein the second additional elastic beam is formed during etching of the third device layer and the third dielectric layer.

\* \* \* \* \*